US 6,725,147 B2
Apr. 20, 2004

(12) United States Patent
Mollin

(10) Patent No.: US 6,725,147 B2
(45) Date of Patent: Apr. 20, 2004

(54) SYSTEM AND METHOD FOR PREDICTING QUANTITY OF INJECTED FUEL AND ADAPTATION TO ENGINE CONTROL SYSTEM

(75) Inventor: Chad Mollin, Arlington Heights, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 342 days.

(21) Appl. No.: 10/003,980

(22) Filed: Oct. 31, 2001

(65) Prior Publication Data

US 2003/0083801 A1 May 1, 2003

(51) Int. Cl.$^7$ .................................................. G05D 1/00
(52) U.S. Cl. ........................ 701/104; 701/102; 701/105; 123/446; 123/448
(58) Field of Search ................................ 701/101–105; 123/446, 478, 480

(56) References Cited

U.S. PATENT DOCUMENTS

| | | | |
|---|---|---|---|
| 4,096,833 A | 6/1978 | Sweet | |
| 4,245,605 A | 1/1981 | Rice et al. | |
| 4,379,332 A | 4/1983 | Busser et al. | |
| 4,402,294 A | 9/1983 | McHugh et al. | |
| 4,619,234 A | 10/1986 | Okamoto | |
| 4,847,771 A | 7/1989 | Scarnera | |
| 4,972,293 A | 11/1990 | Verner | |
| 5,575,264 A | 11/1996 | Barron | |
| 5,634,448 A | 6/1997 | Shinogle et al. | |
| 5,771,857 A | 6/1998 | Willi | |
| 5,806,497 A | 9/1998 | Hosoya | |
| 5,839,420 A | 11/1998 | Thomas | |
| 5,979,400 A | * 11/1999 | Nishide | 123/305 |
| 6,112,720 A | 9/2000 | Matta | |
| 6,244,241 B1 | * 6/2001 | Mamiya et al. | 123/295 |
| 6,435,165 B1 | 8/2002 | Hill et al. | |
| 6,480,781 B1 | * 11/2002 | Hafner et al. | 701/104 |
| 6,561,164 B1 | * 5/2003 | Mollin | 123/446 |
| 2003/0079723 A1 | * 5/2003 | Mollin | 123/446 |

FOREIGN PATENT DOCUMENTS

EP  0 095 190 A2  11/1983

* cited by examiner

Primary Examiner—Willis R. Wolfe
Assistant Examiner—Johnny H. Hoang
(74) Attorney, Agent, or Firm—Dennis Kelly Sullivan; Susan L. Lukasik; Jeffrey P. Calfa

(57) ABSTRACT

A method of deriving a formula (FIG. 4) for calculating a quantity of fuel injected by an electric-actuated fuel injector (16) during an injection wherein duration of the injection is set by duration of an electric signal (P1, P2) applied to the fuel injector and pressure (ICP) at which the fuel is injected is set by pressure of hydraulic fluid applied to the fuel injector. The fuel injector is mapped by applying, various combinations of different selected hydraulic fluid pressures and different selected durations of the electric signal to create data sets of the corresponding selected hydraulic fluid pressure, the corresponding selected electric signal duration, and the quantity of fuel injected. Data from the data sets is processed to create terms of a multiple term mathematical formula that is used to calculate the quantity of fuel injected.

25 Claims, 7 Drawing Sheets

SYSTEM AND METHOD FOR PREDICTING QUANTITY OF INJECTED FUEL AND ADAPTATION TO ENGINE CONTROL SYSTEM

FIELD OF THE INVENTION

This invention relates generally to internal combustion engines having electric-actuated fuel injectors that inject fuel into combustion chambers of the engine. More particularly it relates to a system and method that uses several variables, including injector control pressure and the duration of an injector-actuation signal applied to the fuel injectors, in a process that calculates the quantity of fuel injected by a fuel injector during an injection.

BACKGROUND OF THE INVENTION

A known electronic engine control system comprises a processor-based engine controller that processes various data to develop fueling data for the engine. The fueling data represents a quantity of fuel that is to be introduced into the engine for combustion. That control system also includes an injector control module, or injector driver module, for operating fuel injectors that inject fuel into the engine in quantities corresponding to the fueling data. The fueling data is supplied to the injector control module from the engine controller, and the injector control module has its own processor for processing the supplied data to develop proper data for causing the fuel injectors to inject fuel in quantities corresponding to the fueling data calculated by the engine controller. For any one or more of various reasons that need not be discussed here, the injector control module may also make certain adjustments to the supplied data when the engine control strategy and/or injector calibration make it appropriate to do so.

The injector control module also comprises injector drivers each of which delivers an electric current signal to an electric actuator of the respective fuel injector. A fuel injector may have one or more electric actuators depending on its particular construction. The signal that is applied to a fuel injector to cause an injection of fuel is commonly referred to generically as a pulse width modulated signal. In the case of a fuel injector that has a single actuator, the actuating signal is a true pulse whose width sets the amount of time of an injection, and hence essentially determines the quantity of fuel that the fuel injector injects into the corresponding engine cylinder in consequence of that applied pulse. In the known engine controller that is being referred to, it is the injector control module that calculates the pulse width by processing the fueling data supplied to it by the engine controller.

The particular nature of the electric actuation of any particular fuel injector depends on the particular construction of the fuel injector. There is the single actuator type mentioned above. Another type of fuel injector, one for a compression-ignition internal combustion engine, comprises an intensifier piston for creating a high-pressure injection of fuel directly into an associated engine cylinder. The intensifier piston comprises a head of given end area exposed to a control fluid, oil for example, in a control chamber, and a plunger, or rod, of smaller end area exposed to liquid fuel in an injection chamber. The electric actuator comprises a spool valve that uses two electric actuators, i.e. solenoid coils, to control the introduction of pressurized control fluid into the control chamber and the draining of control fluid from the control chamber.

When an electric signal for initiating a fuel injection is applied to one of the two electric actuators for the spool valve, control fluid is introduced under pressure through one portion of the spool valve into the control chamber to downstroke the intensifier piston and cause fuel in the injection chamber to be injected under pressure from a nozzle of the fuel injector into an associated engine cylinder. The intensifier piston amplifies the pressure of the control fluid by a factor equal to the ratio of the head end area to the plunger end area to cause the amplified pressure to be applied to liquid fuel in the injection chamber. As a result, fuel is injected into a combustion chamber at a pressure substantially greater than the pressure of the control fluid.

When an electric signal for terminating the fuel injection is applied to the other electric actuator, the spool valve operates to terminate the downstroke of the intensifier piston and instead allow control fluid to drain from the control chamber through another portion of the spool valve so that the intensifier piston can then upstroke to re-charge the injection chamber with liquid fuel in preparation for the next injection.

Examples of fuel injectors having valves like those just described appear in U.S. Pat. Nos. 3,837,324; 5,460,329; 5,479,901; and 5,597,118.

Where a single electric actuator controls a fuel injector valve, the beginning of an electric pulse applied to the actuator initiates an injection, and the injection terminates when the pulse ends. The injection time is therefore set by the width, i.e. time duration, of the actual electric pulse applied to the injector actuator.

Commonly assigned U.S. Pat. No. 6,029,628 is an example of a fuel injector comprising two electric actuators that operate respective valve mechanisms. A supply valve mechanism is controlled by an electric supply valve actuator for selectively controlling flow of control fluid through a supply passage for downstroking an intensifier piston. A drain valve mechanism is controlled by an electric drain valve actuator for selectively controlling flow of control fluid through a drain passage. Each valve actuator is selectively operable independent of the other to selectively operate the respective valve mechanism independent of the other. Actuation of the supply valve mechanism while the drain valve mechanism is not being actuated initiates an injection, and the injection terminates when the drain valve mechanism is actuated.

The use of two electric signals, each applied to a respective one of the two actuators, to set the duration of a fuel injection is like that described previously for the fuel injector that has two actuators for operating a spool valve because the difference between the times at which the two actuators are actuated, rather than the time duration of an actual electric pulse, controls the duration of an injection. But the two signals in effect define a pulse width for operating the fuel injector that is equivalent to the pulse width of a single pulse signal that determines the injection time of a fuel injector that has only a single electric actuator. Hence, reference to pulse width in a generic context should be understood to include an actual pulse width of a single signal or an equivalent pulse width resulting from the use of one signal to initiate an injection and another signal to terminate the injection.

The known engine controller also contains one or more look-up tables that its processor uses to calculate the desired fueling data, which is then processed to calculate the widths of electric pulses that operate the fuel injectors. The look-up tables are derived from actual testing of fuel injectors. Fuel injectors are mapped for various combinations of values for injector control pressure and actuating signal pulse width. Each combination of values defines a corresponding value for desired fueling data. A sufficient number of combinations are needed to cover the relevant ranges of the variables, but the available size of the look-up tables ultimately determines how many combinations can actually be stored in memory of the controller.

While increasing look-up table size, and hence the number of combinations that can be stored, will endow the tables with a higher degree of resolution that may be desirable for increased fueling accuracy, the increased size of the electronic storage medium that is required to contain the stored data increases the cost of the controller. A greater amount of mapping is also required in order to obtain the greater amount of data.

A lesser number of stored combinations may decrease the resolution, and hence decrease fueling accuracy. The processor may then on occasion have to interpolate the mapped data in order to yield desired fueling data, and where non-linearity is present in the fuel injector, linear interpolation may not yield the accuracy that would be obtained from a larger table of greater resolution.

Regardless of fuel injector type or of how fuel injector data is mapped into a controller, fuel injector calibration is also important for securing desired fueling. Mass production methods inherently result in some variation in calibration from fuel injector to fuel injector, and while such methods may strive to minimize the range of these variations, the ranges remain significant enough that some classification of fuel injectors according to a number of different calibration categories, or groups, is appropriate in a mass production environment. The mapping of fuel injector data that has been described above may therefore represent mean data obtained from mapping a number of individual fuel injectors statistically representative of a universe of fuel injectors, in which case the calculated fueling data may be further processed to account for individual fuel injector calibration.

Hence, before it is assembled to an engine, a mass-produced fuel injector is operated to ascertain its actual calibration. The actual calibration determines into which particular one of a number of different calibration categories the fuel injector falls. The fuel injector is then identified by that particular category. When an engine is being manufactured, the associated engine controller is programmed in such a way that the particular calibration category of the fuel injector for each particular engine cylinder is made available to the controller. The controller uses that data to calibrate electric control signals to the fuel injectors, typically to secure injection of fuel in substantially equal quantities to each combustion chamber for a given value of fueling data calculated by the engine controller.

U.S. Pat. No. 5,575,264 discloses a method for associating actual performance data with a fuel injector. The data is contained in a medium, such as an EEPROM, that is mounted on the fuel injector body and that is suitable for reading by an associated engine controller.

U.S. Pat. No. 5,839,420 relates to a method for compensating a fuel injection system for fuel injector variability. Each fuel injector includes a storage medium that contains a calibration code identifying the actual calibration of the fuel injector. An associated engine controller converts a raw energizing time to a calibrated energizing time for each fuel injector based the calibration code for the fuel injector.

U.S. Pat. No. 5,634,448 relates to another method for trimming fuel injectors to compensate for fuel injector variability.

U.S. Pat. No. 4,402,294 relates to a system for calibrating fuel injectors.

Other patents that relate to systems and methods for calculating engine fueling and/or correcting the calculation for factors such as individual fuel injector calibration are U.S. Pat. No. 4,379,332; U.S. Pat. No. 4,619,234; and U.S. Pat. No. 5,806,497.

Given the significant effort that is needed to map and calibrate fuel injectors, and the amount of media needed to store a sufficient amount of mapped data to cover relevant ranges of variable parameters affecting engine fueling, as discussed above, it would be desirable to provide a system and a method that reduce the extent of the mapping effort and of the amount of data storage that is needed. It is toward these objectives that the present invention is directed.

SUMMARY OF THE INVENTION

The present invention relates to a system and method for calculating the quantity of fuel injected during an injection without using a look-up table, or tables, containing values of desired engine fueling correlated with various combinations of variable parameters, such as injector control pressure and actuating signal pulse width. Rather, the inventive system and method comprise processing variable parameters according to a formula that yields a resultant value of desired engine fueling. The processing is performed with sufficient speed by a processor to continually update the desired engine fueling in real time.

A related aspect concerns a system and method for deriving the formula, including the derivation of certain coefficients that are used in the formula.

Accordingly, a generic aspect of the present invention relates to a method of deriving a formula for calculating a quantity of fuel injected by an electric-actuated fuel injector during an injection wherein duration of the injection is set by duration of an electric signal applied to the fuel injector and pressure at which the fuel is injected is set by pressure of hydraulic fluid applied to the fuel injector. The method comprises mapping the fuel injector by applying, to the fuel injector, various combinations of different selected hydraulic fluid pressures and different selected durations of the electric signal. For each combination, the quantity of fuel injected is measured to create a corresponding data set for the combination that comprises the corresponding selected hydraulic fluid pressure, the corresponding selected electric signal duration, and the quantity of fuel injected in consequence of the application of the corresponding selected hydraulic fluid pressure and the corresponding selected electric signal duration to the fuel injector. Data from the data sets is processed to create terms of a multiple term mathematical formula that is used to calculate the quantity of fuel injected, wherein the terms of the formula include as variables, the electric signal duration and the hydraulic fluid pressure.

Another generic aspect of the present invention relates to a system for deriving a formula for calculating a quantity of fuel injected by an electric-actuated fuel injector during an injection wherein duration of the injection is set by duration of an electric signal applied to the fuel injector and pressure at which the fuel is injected is set by pressure of hydraulic fluid applied to the fuel injector. The system comprises apparatus for mapping the fuel injector by applying various combinations of different selected hydraulic fluid pressures and different selected durations of the electric signal to the fuel injector. For each combination, the quantity of fuel injected is measured to create a corresponding data set for the combination that comprises the corresponding selected hydraulic fluid pressure, the corresponding selected electric signal duration, and the quantity of fuel injected in consequence of the application, to the fuel injector, of the corresponding selected hydraulic fluid pressure and the corresponding selected electric signal duration. A processor processes data from the data sets to create terms of a multiple term mathematical formula for calculating the quantity of fuel injected, wherein the terms of the formula include as variables, the electric signal duration and the hydraulic fluid pressure.

Still another generic aspect of the present invention relates to an internal combustion engine comprising one or more electric-actuated fuel injectors each of which injects fuel into a respective combustion chamber of the engine as a function of injector control pressure and the duration of an electric actuating signal that sets the duration of a fuel injection to achieve an injection quantity determined at least in part by a desired fueling data representing desired fueling of the engine. An engine control system comprises one or more processors that calculate the desired fueling data, and from the desired fueling data, the duration of the electric actuating signal for each fuel injector. The calculation is performed by processing the desired fueling data and data representing injector control pressure, including processing, according to a mathematical formula, data correlated with the desired fueling data and data representing injector control pressure, to develop data that the control system further processes to calculate the duration of the electric actuating signal.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 1A is a general schematic diagram of an exemplary engine and control system resulting from the present invention.

DESCRIPTION OF THE PREFERRED EMBODIMENT

Figure 1:
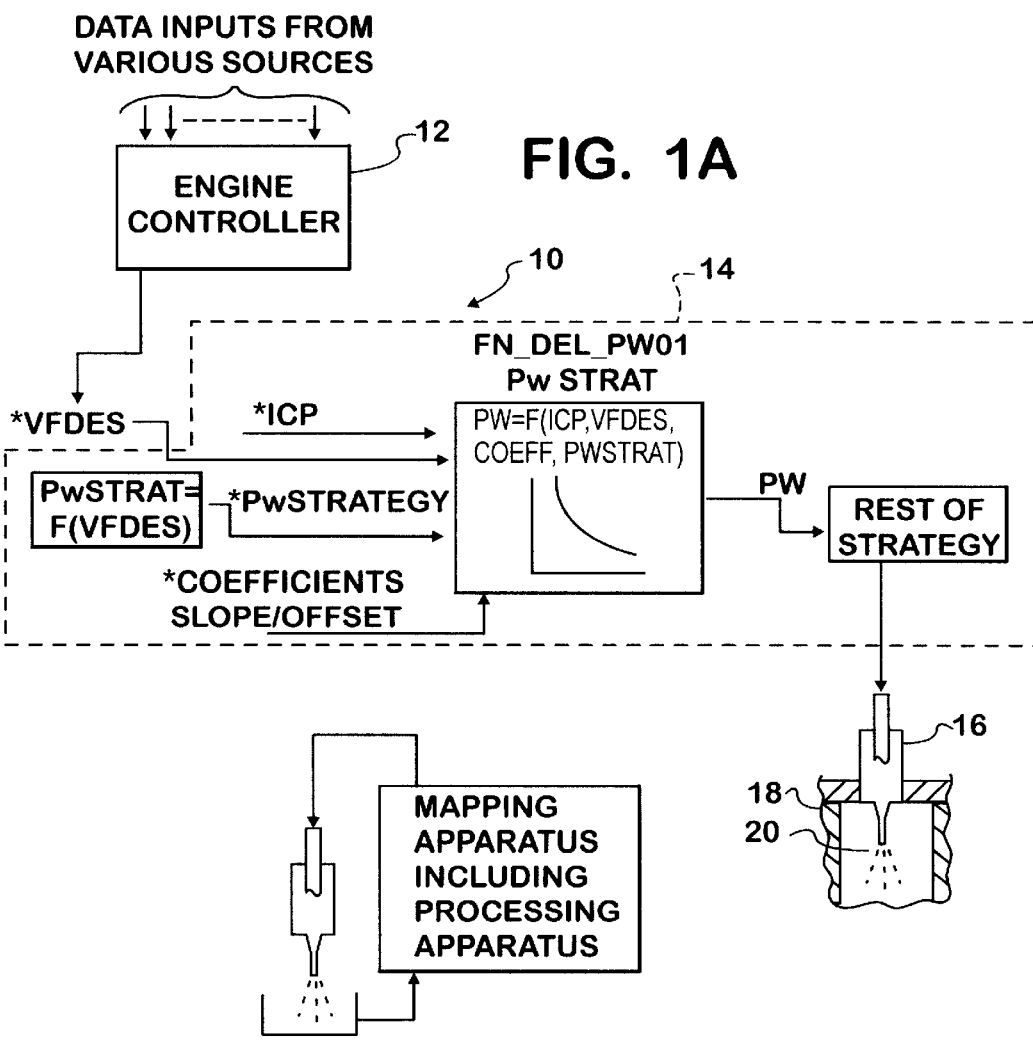
FIG. 1 is a general schematic diagram of an exemplary embodiment of certain apparatus used in practice of the present invention.

FIG. 1A shows a schematic diagram of an exemplary engine control system 10 that utilizes results from a method that will subsequently be described with reference to FIG. 1. Control system 10 comprises a processor-based engine controller 12 and an injector control module, or injector driver module, 14 for controlling the operation of electric-actuated fuel injectors 16 that inject fuel into combustion chambers of an internal combustion engine 18, such as in a multi-cylinder, compression-ignition internal combustion engine that powers an automotive vehicle. Although FIG. 1A shows an arrangement for only one cylinder 20, a respective fuel injector 16 is associated with each cylinder. Each fuel injector comprises a body that is mounted on the engine and has a nozzle through which fuel is injected into the corresponding engine cylinder.

Controller 12 operates each fuel injector 16 via injector control module 14, causing a respective driver circuit (not shown) in module 14 to actuate the respective fuel injector at the appropriate time in the engine operating cycle. The processor of controller 12 processes various items of data to develop data representing desired quantities of fuel to be injected by the individual fuel injectors. Such data will be referred to as desired fueling data represented by the symbol vfdes. The desired fueling data is supplied to injector control module 14, which may have its own processor for perform further processing of the supplied data to develop data that is in turn converted to corresponding electric signals for the injector drivers that operate the fuel injectors. Data representing the present injector control pressure ICP is also available to injector control module 14.

Each fuel injector 16 comprises an electric-actuated injection mechanism, such as one of the types described earlier. A fuel injection from an injector is initiated by an initiating electric signal applied to the fuel injector by the respective driver circuit. The fuel injection terminates when the electric signal changes to a terminating electric signal. The initiating electric signal may be the leading edge of a rectangular pulse, and the terminating signal, the trailing edge in the case of an injector that has a single electric actuator. The time between the edges is the pulse width, which may be modulated according to the amount of fuel to be injected. Therefore, when a true pulse width modulated signal is used to operate the fuel injector, using the leading edge of a pulse as an injection-initiating signal and the trailing edge as an injection-terminating signal, the timing of the initiating and terminating electric signals determines the quantity of fuel injected, and the actual pulse width may be adjusted to take into account other data that at certain times is appropriate to use in making some adjustment of vfdes.

Injector control module 14 may therefore at times make certain adjustments to the desired fueling data vfdes received from controller 12 for developing the pulse widths of the electric current signals supplied to the fuel injectors. One reason for injector control module 14 to make an adjustment of the desired fueling data that is supplied from controller 12 is to compensate for certain characteristics of the specific fuel injectors, such as the injector calibration mentioned above. That implementation of the inventive system and method provides a system and method that are the subject of the inventor's commonly assigned patent application "SYSTEM AND METHOD FOR CALIBRATING FUEL INJECTORS IN AN ENGINE CONTROL SYSTEM THAT CALCULATES INJECTION DURATION BY MATHEMATICAL FORMULA" Ser. No. 10/039,387 filed of even date. Another reason for adjustment of the desired fueling data, a reason that need not be discussed here, is to compensate for prevailing conditions that otherwise would contribute to deviation of the actual amount of fuel injected from the desired amount, such as a cold start for example.

The desired fueling data vfdes supplied to injector control module 14 represents a certain pulse width for the signal to be applied to a fuel injector to deliver a corresponding amount of fuel to the engine cylinder based on some set of base conditions for the engine and ambient.

In the case of a fuel injector that has two electric actuators, one of which is energized to initiate a fuel injection and the other of which is energized to terminate the fuel injection, a respective signal is applied to each actuator. However, as explained above, the difference in time between the applications of the two signals is equivalent to a pulse width of a single electric actuating signal. Further description of the invention with reference to the drawing Figures is premised on the fuel injectors being of the two-actuator type.

The present invention relates to a system and method of deriving a formula for calculating a quantity of fuel injected by each such fuel injector 16. The formula is programmed into one of the processors of engine control system 10. The method comprises mapping a representative fuel injector 16 by applying various combinations of different selected hydraulic fluid pressures and different selected durations of the electric actuating signal. For each combination, the quantity of fuel injected is measured to create a corresponding data set for the combination. Each data set comprises the corresponding selected hydraulic fluid pressure, the corresponding selected electric signal duration, and the quantity of fuel injected in consequence of the application of the corresponding selected hydraulic fluid pressure and the corresponding selected electric signal duration to the fuel injector. The mapping apparatus is shown generally in FIG. 1 and includes various pieces of measuring equipment and processing apparatus.

Because the fuel injector of the example has two electric actuators, a first signal P1 is used to initiate a fuel injection by energizing one of the two actuators, and a second signal P2 is used to terminate the fuel injection by energizing the other of the two actuators. Hence, the result of the mapping comprises a number of data sets each containing P1 data, P2 data, injector control pressure data, and injected fuel quantity data. The data sets were then sorted into groups such that the injector control pressure data for the data sets of a given group was the same. A multiple linear regression was conducted on the data in each group. The following is an example of an actual mapping undertaken on a particular fuel injector. (A multiple polynomial regression can be undertaken injector control pressures that occur within a pressure range, low injector control pressures for example, where linearity is questionable.)

The equations used for the multiple linear regression are given below as taken from Probability and Statistics for Engineers and Scientists, Walpole and Myers. ($2^{nd}$ edition 1978, $3^{rd}$ edition 1985, MacMillan, NY, N.Y.).

$$nb_o + b_1\sum_{i=1}^{n} x_{1i} + b_2\sum_{i=1}^{n} x_{2i} + b_3\sum_{i=1}^{n} x_{3i} = \sum_{i=1}^{n} y_i$$

$$b_o\sum_{i=1}^{n} x_{1i} + b_1\sum_{i=1}^{n} x_{1i}^2 + b_2\sum_{i=1}^{n} x_{1i}x_{2i} + b_3\sum_{i=1}^{n} x_{1i}x_{3i} = \sum_{i=1}^{n} x_{1i}y_i$$

$$b_o\sum_{i=1}^{n} x_{2i} + b_1\sum_{i=1}^{n} x_{1i}x_{2i} + b_2\sum_{i=1}^{n} x_{2i}^2 + b_3\sum_{i=1}^{n} x_{2i}x_{3i} = \sum_{i=1}^{n} x_{2i}y_i$$

$$b_o\sum_{i=1}^{n} x_{3i} + b_1\sum_{i=1}^{n} x_{1i}x_{3i} + b_2\sum_{i=1}^{n} x_{2i}x_{3i} + b_3\sum_{i=1}^{n} x_{3i}^2 = \sum_{i=1}^{n} x_{3i}y_i$$

where x1=P1, x2=P2, x3=injector control pressure, n=the number of measurements, and y=injected fuel quantity.

The equations are then solved for $b_0, b_1, b_2$, and $b_3$ at three different injector control pressures, those pressure being 6 Mpa, 12 Mpa, and 24 Mpa in the example. This resulted in the following equations for injected fuel quantity (fuel volume per injection, or stroke):

$$@6\text{ Mpa}:\text{Fuel}\left(\frac{mm^3}{\text{Stroke}}\right) = -27.622 + 0.018*P_1 + 0.036*P_2 - 0.029394$$

$$@12\text{ Mpa}:\text{Fuel}\left(\frac{mm^3}{\text{Stroke}}\right) = -32.51 + 0.021*P_1 + 0.057*P_2 - 1.8775$$

$$@24\text{ Mpa}:\text{Fuel}\left(\frac{mm^3}{\text{Stroke}}\right) = -18.391 + 0.025*P_1 + 0.082*P_2 - 8.8671$$

Figure 2:
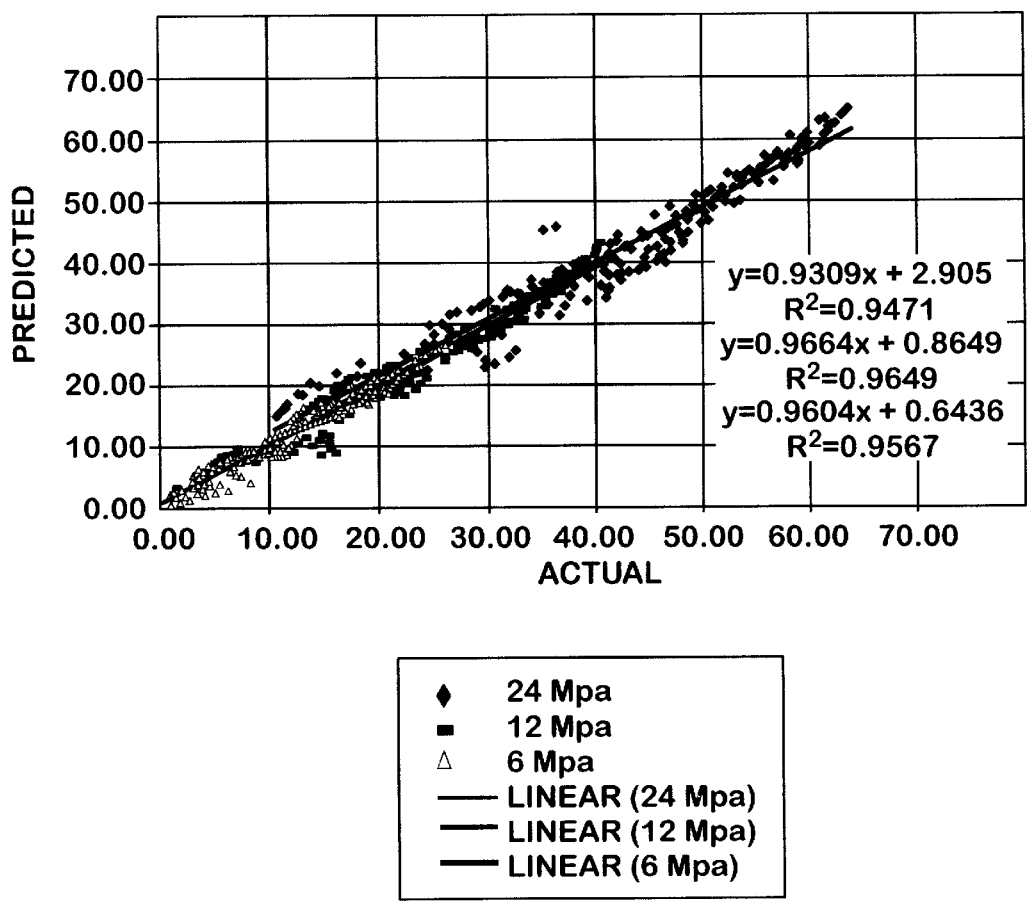
FIG. 2 is a graph showing an example that illustrates certain steps involved in practice of the present invention.

Plotting the actual data for each of the three injector control pressures vs. their respective predicted values gives the correlation agreement shown in FIG. 2. As can be seen from the substantial 45 degree line fit, the correlations on an individual basis are quite good, approximately 95%–96% confidence.

Figure 3:
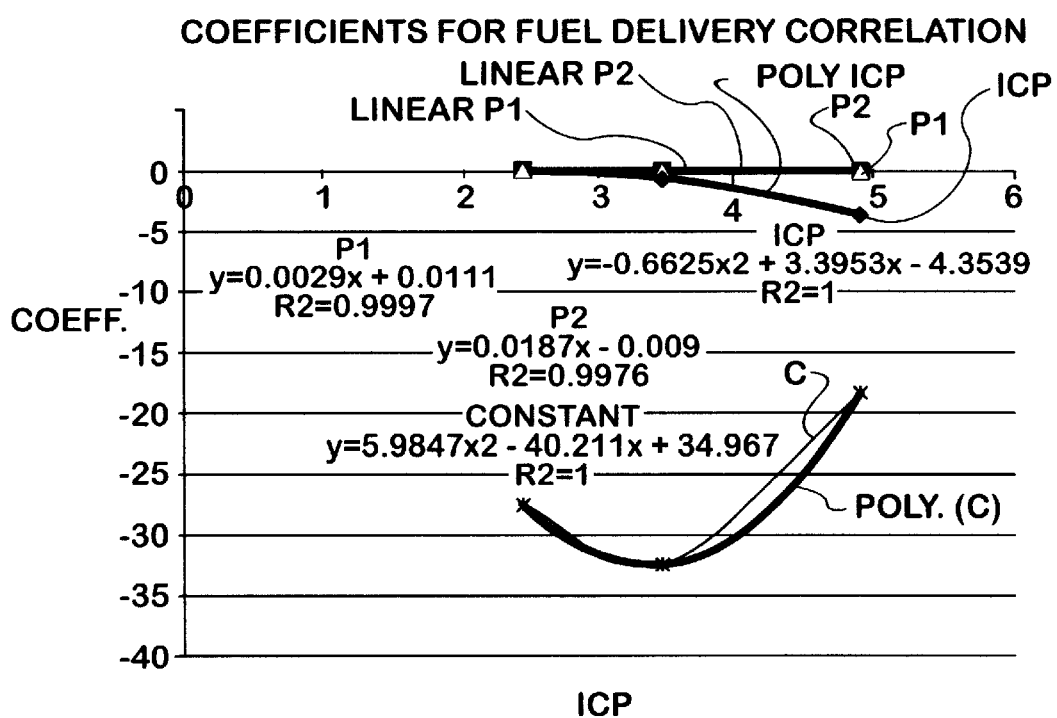
FIG. 3 is a graph showing additional steps.
Figure 3A:
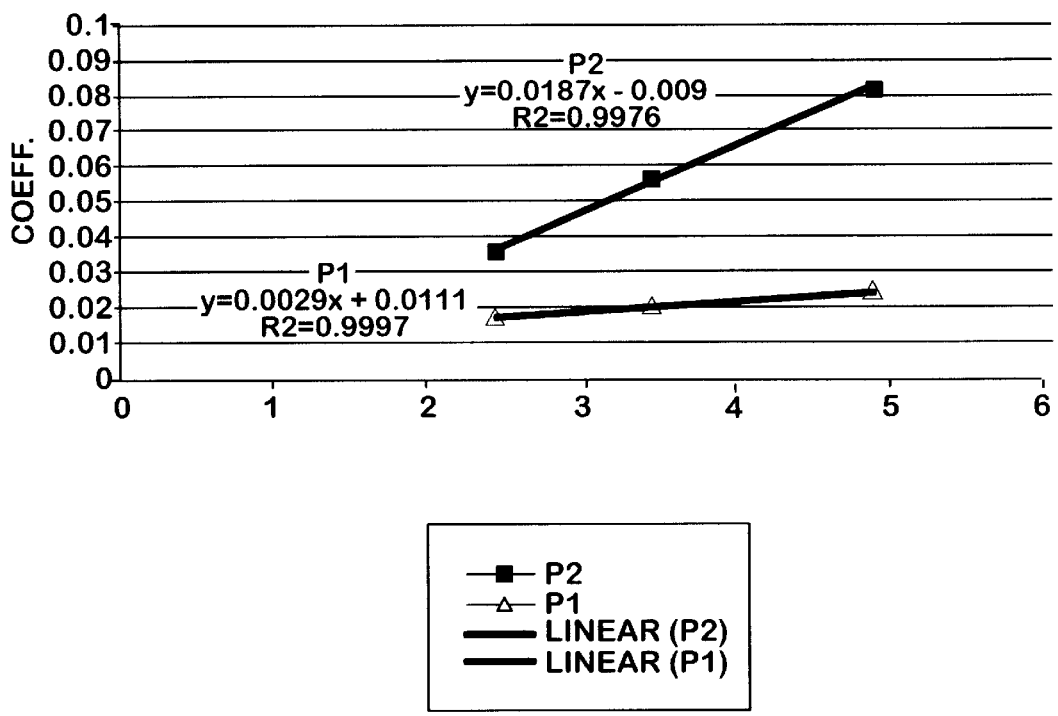
FIG. 3A shows a portion of FIG. 3 on a larger scale.

Because it is considered impractical to implement an infinite number of equations each of which would represent one of an infinite number of possible injected fuel quantities, the next step in the example involves determining the equations which best represent the individual coefficients. This can be done by plotting the coefficients vs. injector control pressure for best fit as shown in FIGS. 3 and 3A.

From the equations for the line fits of the coefficients vs. injector control pressure, the following equations for the coefficients were obtained:

$$\text{Constant} = 5.9847*ICP - 40.211*\sqrt{ICP} + 34.967$$

$$\text{P1Coeff.} = 0.0029*\sqrt{ICP} + 0.011$$

$$\text{P2Coeff.} = 0.0187*\sqrt{ICP} - 0.009$$

$$\text{ICPCoeff.} = -0.6625*ICP + 3.3953*\sqrt{ICP} - 4.3539$$

And then by applying the coefficients to terms of an equation and including a shift factor, the following generalized equation for injected fuel quantity was developed:

$$FuelDelivery\left(\frac{mm^3}{\text{Stroke}}\right) = 13 + (5.9847*ICP - 40.211*\sqrt{ICP} + 34.967 + (0.0029*\sqrt{ICP} + 0.011)*P_1 + (0.0187*\sqrt{ICP} - 0.009)*P_2 + (-0.6625*ICP + 3.3953*\sqrt{ICP} - 4.3539)*\sqrt{ICP}$$

Hence, the foregoing shows that data from the data sets was processed to create terms of a multiple term mathematical formula that can be used to calculate the quantity of fuel injected, wherein the terms of the formula include as variables, the electric signal duration and the hydraulic fluid pressure.

Figure 4:
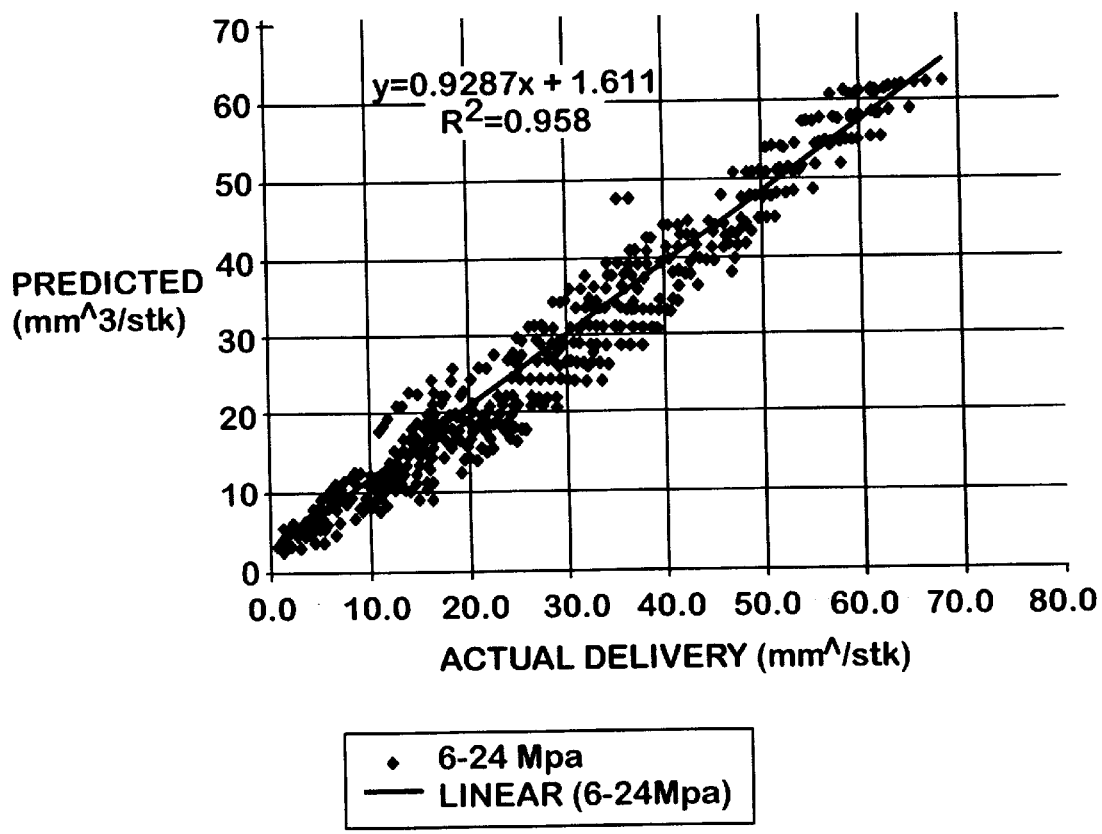
FIG. 4 is a graph showing correlation of actual fueling measurements with calculated desired fueling derived through use of the inventive principles.

FIG. 4 verifies that the method of using the general equation, or formula, derived according to the inventive method, can calculate, with satisfactory accuracy, injected fuel quantity based on P1, P2, and injector control pressure for this type of injector within specified operating ranges.

It is to be understood that each particular type of fuel injector may require development of its own unique general equation.

Figure 5:
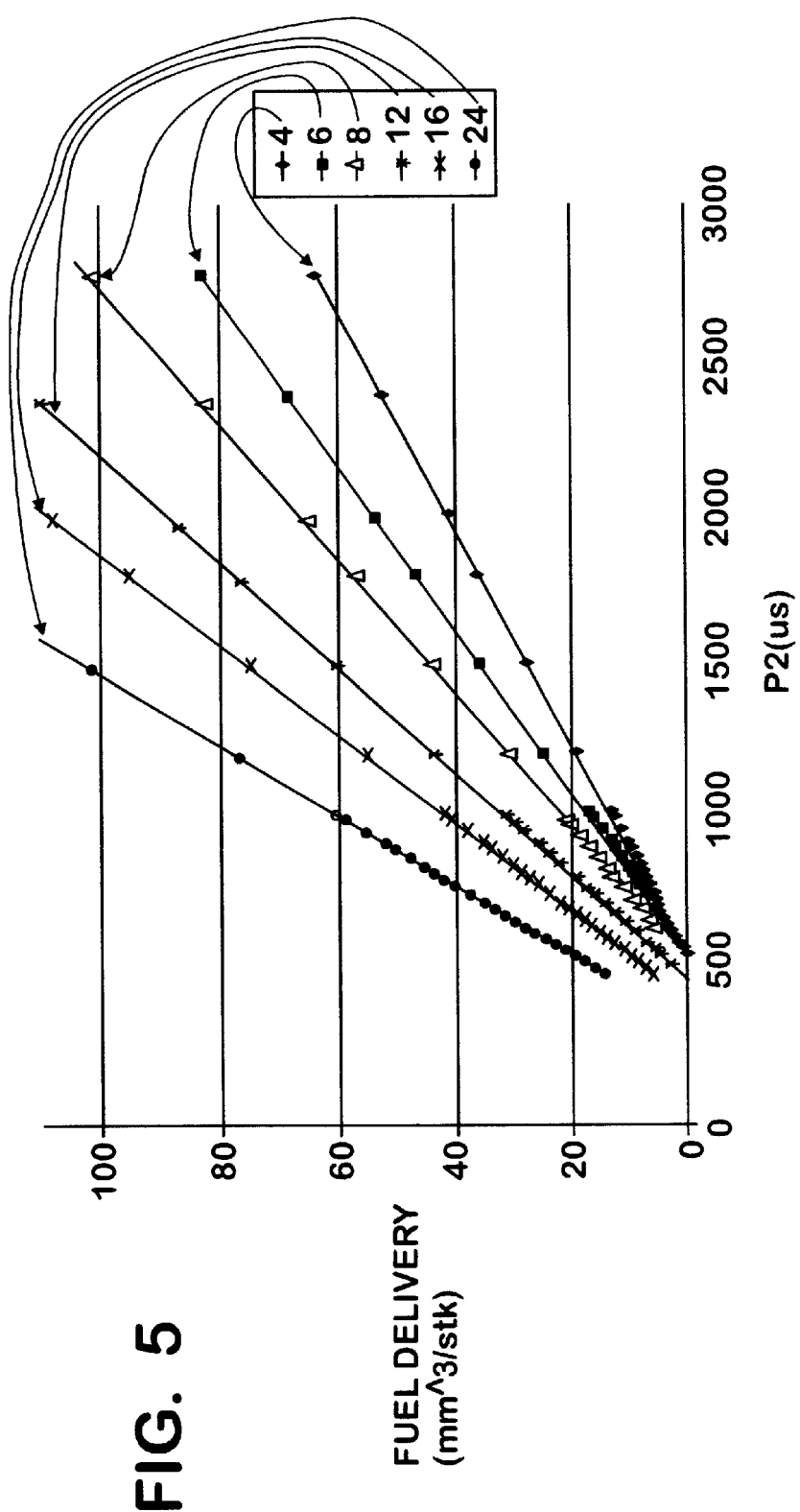
FIG. 5 is a graph showing the relationship between desired fueling and pulse width, derived through use of the inventive principles, for several different injector control pressures.

The correlation shown by FIG. 5 is based on the linear segment for pressures between 6 and 24 Mpa in the particular example. Accuracy below 6 Mpa and at maximum fuel deliveries is problematic due to injector control pressure fluctuations as well as factors that create non-linear conditions, and for such reasons, a multivariable polynomial regression may be required, as noted earlier.

Figure 6:
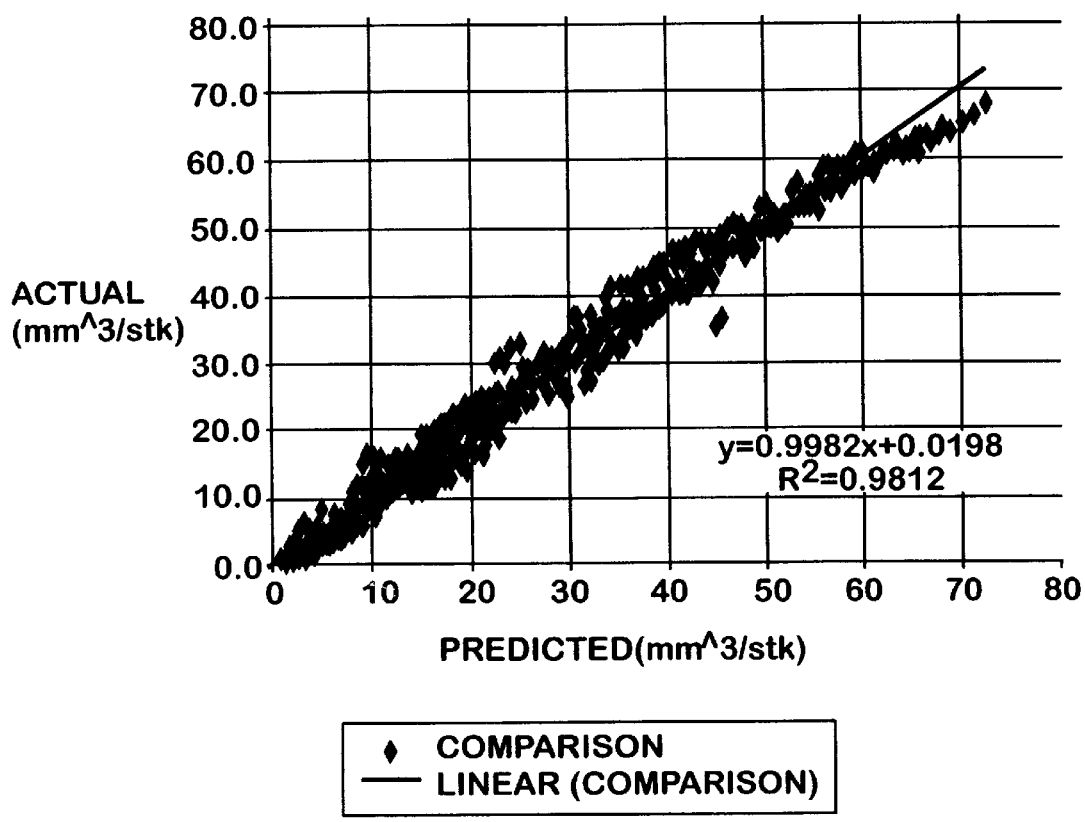
FIG. 6 is a graph similar to FIGS. 2 and 4, but with axes reversed, showing correlation of actual fueling measurements with calculated desired fueling derived through use of certain additional principles of the invention.

Using the statistical software known as SIGMA PLOT, it is possible to improve upon the general equation by using the non-linear regression model. Use of non-linear regression is premised upon having derived the general equation, as described above. The general equation is entered into the SIGMA PLOT software as well as data sets for the three independent variables (P1, P2, and injector control pressure) and the one dependent variable (injected fuel quantity), and the curve fit was tightened. The improved correlation agreement is shown in FIG. 6. An $R^2$ value of 98% was found.

The refined equation is given as:

$$FuelDelivery\left(\frac{mm^3}{Stroke}\right) = 13 + (7.217*ICP - 47.78*\sqrt{ICP} + 34.967) +$$
$$(0.008461*\sqrt{ICP} + 0.011)*P_1 + (0.01866*\sqrt{ICP} - 0.009)*P_2 +$$
$$(-0.9927*ICP + 4.628*\sqrt{ICP} - 4.3539)*\sqrt{ICP}$$

The development of a single empirical equation that can predict fuel deliveries over a range of 6–24 Mpa with a correlation agreement of 98% is believed to afford opportunities to engine control strategy designers and engine calibrators to significantly simplify control strategy and calibration procedures.

Processors of engine control systems can process data sufficiently fast to calculate, in real time, the duration of injector actuation using the above general equation or its refined version. In such case, the control system is programmed with either equation, but with the equation rearranged to solve for P2. The engine controller processes certain data that is relevant to calculating desired engine fueling in terms of quantity of fuel injected per injection, or stroke of a fuel injector. The calculated data representing desired engine fueling is compared to a predefined limit that is contained in the control system. The control system selects a predetermined constant as data for P1 when the desired fueling data exceeds the predefined limit, but equates P1 to P2 by substituting P2 for P1 in the formula when the desired fueling data is equal to or less than the predefined limit. The result of the processing is data that defines a value for P2, that in conjunction with the data for P1, defines the duration of a fuel injection that will cause the quantity of fuel injected during the injection at the prevailing injector control pressure ICP to be substantially equal to the desired fueling, ignoring for the moment possible adjustment due to factors that may call for some adjustment, as mentioned earlier, to compensate for certain influences. Even when adjustment is made, the actual quantity injected is determined at least in substantial part by the general formula, or its refined version, as rearranged to develop data for setting the duration of injector actuation to produce one injection of fuel. As may be seen from the related application cited above (Attorney Docket No. 5146), the general formula, or its refined version, may be tailored to take into account the particular calibration of each fuel injector in an engine. It is possible that a particular control strategy may still at times adjust the tailored formula to compensate for certain influences that call for compensation, such as cold starting for example.

Certain fuel injection strategies employ a pilot injection, followed by a main injection. Principles of the invention may be applied to either or both types of injection in such an injection strategy.

While a presently preferred embodiment of the invention has been illustrated and described, it should be appreciated that principles of the invention apply to all embodiments falling within the scope of the following claims.

What is claimed is:

1. A method of deriving a formula for calculating a quantity of fuel injected by an electric-actuated fuel injector during an injection wherein duration of the injection is set by duration of an electric signal applied to the fuel injector and pressure at which the fuel is injected is set by pressure of hydraulic fluid applied to the fuel injector, the method comprising:

mapping the fuel injector by applying, to the fuel injector, various combinations of different selected hydraulic fluid pressures and different selected durations of the electric signal, and for each combination, measuring the quantity of fuel injected to create a corresponding data set for the combination that comprises the corresponding selected hydraulic fluid pressure, the corresponding selected electric signal duration, and the quantity of fuel injected in consequence of the application, to the fuel injector, of the corresponding selected hydraulic fluid pressure and the corresponding selected electric signal duration; and processing data from the data sets to create terms of a multiple term mathematical formula that is used to calculate the quantity of fuel injected, wherein the terms of the formula include as variables, the electric signal duration and the hydraulic fluid pressure.

2. A method as set forth in claim 1 wherein the processing step comprises an intermediate step that comprises: for each selected hydraulic fluid pressure, processing from the data sets that include that selected hydraulic fluid pressure, the electric signal durations and the quantities of fuel injected to create data for coefficients for terms of a respective intermediate formula for calculating the quantity of fuel injected at the selected hydraulic pressure as a function of the electric signal duration.

3. A method as set forth in claim 2 wherein the intermediate processing step comprises: for each selected hydraulic fluid pressure, creating the data for the coefficients for the terms of the respective intermediate formula by processing, by linear regression, the electric signal durations and the quantities of fuel injected from the data sets that include that selected hydraulic fluid pressure.

4. A method as set forth in claim 3 wherein the processing step includes a further intermediate step of processing the data for the coefficients for the terms of the intermediate formulas to create certain data that appears in coefficients for respective terms of the formula for calculating the quantity of fuel injected, the latter terms including as variables, electric signal duration and hydraulic fluid pressure.

5. A method as set forth in claim 4 wherein the further intermediate step comprises creating the certain data that appears in the coefficients for terms of the formula for calculating the quantity of fuel injected by processing the data for the coefficients for terms of the intermediate formulas according to best fit processing.

6. A method as set forth in claim 5 including a still further intermediate step that comprises processing, by non-linear regression, data appearing in the coefficients for terms of the formula for calculating the quantity of fuel injected to refine those coefficients for improved formula accuracy.

7. A method as set forth in claim 1 wherein the processing step comprises processing the electric signal durations and the quantities of fuel injected according to a process that yields certain data, one portion of which appears in a coefficient for a term of the formula that contains the electric signal duration as a first-power variable and another portion of which appears in a coefficient for a term of the formula that contains the hydraulic fluid pressure as a one-half-power variable.

8. A method as set forth in claim 1 wherein each duration of the electric signal is cooperatively defined by one variable that initiates actuation of the fuel injector to initiate an injection and another variable that terminates actuation of the fuel injector to terminate the injection, and the processing step comprises an intermediate step that comprises: for each selected hydraulic fluid pressure, processing, by linear regression, from the data sets that include that selected hydraulic fluid pressure, the values of the variables that define the electric signal duration and the quantities of fuel injected to create data for coefficients for terms of a respective intermediate formula for calculating the quantity of fuel injected at the selected hydraulic pressure as a function of the one and the another variables.

9. A method as set forth in claim 8 wherein the processing step includes the further intermediate step of processing the data for the coefficients for terms of the intermediate formulas to create certain data that appears in coefficients for first, second, and third terms of the formula for calculating the quantity of fuel injected, wherein the first term includes the one variable that initiates an injection, the second term includes the another variable that terminates an injection, and the third term includes hydraulic fluid pressure as a variable.

10. A method as set forth in claim 9 wherein the further intermediate step comprises creating the certain data that appears in the coefficients for the first, second, and third terms by processing the data for the coefficients for the terms of the intermediate formulas according to best fit processing.

11. A system for deriving a formula for calculating a quantity of fuel injected by an electric-actuated fuel injector during an injection wherein duration of the injection is set by duration of an electric signal applied to the fuel injector and pressure at which the fuel is injected is set by pressure of hydraulic fluid applied to the fuel injector, the system comprising:

mapping apparatus for mapping the fuel injector by applying, to the fuel injector, various combinations of different selected hydraulic fluid pressures and different selected durations of the electric signal, and for each combination, measuring the quantity of fuel injected to create a corresponding data set for the combination that comprises the corresponding selected hydraulic fluid pressure, the corresponding selected electric signal duration, and the quantity of fuel injected in consequence of the application, to the fuel injector, of the corresponding selected hydraulic fluid pressure and the corresponding selected electric signal duration; and processing apparatus for processing data from the data sets to create terms of a multiple term mathematical formula for calculating the quantity of fuel injected, wherein the terms of the formula include as variables, the electric signal duration and the hydraulic fluid pressure.

12. A system as set forth in claim 11 wherein the processing apparatus operates to perform an intermediate step that comprises: for each selected hydraulic fluid pressure, processing from the data sets that include that selected hydraulic fluid pressure, the electric signal durations and the quantities of fuel injected to create data for coefficients for terms of a respective intermediate formula for calculating the quantity of fuel injected at the selected hydraulic pressure as a function of the electric signal duration.

13. A system as set forth in claim 12 wherein the processing apparatus operates to perform the intermediate processing step by creating, for each selected hydraulic fluid pressure, the data for the coefficients for the terms of the respective intermediate formula by processing, by linear regression, the electric signal durations and the quantities of fuel injected from the data sets that include that selected hydraulic fluid pressure.

14. A system as set forth in claim 13 wherein the processing apparatus operates to perform a further intermediate step of processing the data for the coefficients for the terms of the intermediate formulas to create certain data that appears in coefficients for respective terms of the formula for calculating the quantity of fuel injected, the latter terms including as variables, electric signal duration and hydraulic fluid pressure.

15. A system as set forth in claim 14 wherein the processing apparatus operates to perform the further intermediate step by creating the certain data that appears in the coefficients for terms of the formula for calculating the quantity of fuel injected by processing the data for the coefficients for terms of the intermediate formulas according to best fit processing.

16. A system as set forth in claim 15 wherein the processing apparatus operates to perform a still further intermediate step that comprises processing, by non-linear regression, data appearing in the coefficients for terms of the formula for calculating the quantity of fuel injected to refine those coefficients for improved formula accuracy.

17. A system as set forth in claim 11 wherein the processing apparatus operates to process the electric signal durations and the quantities of fuel injected according to a process that yields certain data, one portion of which appears in a coefficient for a term of the formula that contains the electric signal duration as a first-power variable and another portion of which appears in a coefficient for a term of the formula that contains the hydraulic fluid pressure as a one-half-power variable.

18. A system as set forth in claim 17 wherein each duration of the electric signal is cooperatively defined by one variable that initiates actuation of the fuel injector to initiate an injection and another variable that terminates actuation of the fuel injector to terminate the injection, and the processing apparatus operates to perform an intermediate step that comprises: for each selected hydraulic fluid pressure, processing, by linear regression, from the data sets that include that selected hydraulic fluid pressure, the values of the variables that define the electric signal duration and the quantities of fuel injected to create data for coefficients for terms of a respective intermediate formula for calculating the quantity of fuel injected at the selected hydraulic pressure as a function of the one and the another variables.

19. A system as set forth in claim 18 wherein the processing apparatus operates to perform the further intermediate step of processing the data for the coefficients for terms of the intermediate formulas to create certain data that appears in coefficients for first, second, and third terms of the formula for calculating the quantity of fuel injected, wherein the first term includes the one variable that initiates an injection, the second term includes the another variable that terminates an injection, and the third term includes hydraulic fluid pressure as a variable.

20. A system as set forth in claim 19 wherein the processing apparatus operates to perform the further intermediate step by creating the certain data that appears in the coefficients for the first, second, and third terms by processing the data for the coefficients for the terms of the intermediate formulas according to best fit processing.

21. An internal combustion engine comprising:

one or more electric-actuated fuel injectors each of which injects fuel into a respective combustion chamber of the engine as a function of injector control pressure and the duration of an electric actuating signal that sets the duration of a fuel injection to achieve an injection quantity determined at least in part by a desired fueling data representing desired fueling of the engine;

and an engine control system comprising one or more processors that calculate the desired fueling data, and from the desired fueling data, the duration of the electric actuating signal for each fuel injector by processing the desired fueling data and data representing injector control pressure, including processing, according to a mathematical formula, data correlated with the desired fueling data and data representing injector control pressure, to develop data that the control system further processes to calculate the duration of the electric actuating signal.

22. An engine as set forth in claim 21 wherein each duration of the electric actuating signal is cooperatively defined by one variable that initiates actuation of a fuel injector to initiate an injection and another variable that terminates actuation of that fuel injector to terminate that injection, and wherein the control system selects data for the one variable based on the desired fueling data, processes the selected data for the one variable and the injector control pressure data according to the formula to develop data for the another variable that terminates the injection, and wherein the one variable one sets the time at which the electric actuating signal begins and the another variable sets the time at which the electric actuating signal terminates.

23. An engine as set forth in claim 22 wherein the control system selects a predetermined constant as data for the one variable when the desired fueling data exceeds a predefined limit, but equates the one variable to the another variable when the desired fueling data is equal to or less than the predefined limit.

24. An engine as set forth in claim 22 wherein each fuel injector comprises plural electric actuators, one of which is energized to begin a fuel injection and another of which is energized to terminate the fuel injection, and wherein the one variable sets the time at which the one actuator is energized and the another variable sets the time at which the another actuator is energized.

25. An engine as set forth in claim 22 wherein the control system comprises an engine controller comprising a processor that calculates the desired fueling data and an injector control module that comprises a processor that processes the desired fueling data calculated by the engine controller and the data representing the injector control pressure to develop data defining the duration of the electric actuating signal.

* * * * *